United States Patent
Malek et al.

(10) Patent No.: US 9,923,503 B2
(45) Date of Patent: Mar. 20, 2018

(54) FRACTIONAL-ORDER PROPORTIONAL-RESONANT CONTROLLER

(71) Applicant: Ford Global Technologies, LLC, Dearborn, MI (US)

(72) Inventors: Hadi Malek, Dearborn, MI (US); Sara Dadras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/159,878

(22) Filed: May 20, 2016

(65) Prior Publication Data
US 2017/0338761 A1  Nov. 23, 2017

(51) Int. Cl.
| | |
|---|---|
| *G05B 5/00* | (2006.01) |
| *H02P 23/00* | (2016.01) |
| *G05B 6/02* | (2006.01) |
| *B60L 11/02* | (2006.01) |
| *H02P 23/16* | (2016.01) |
| *H02M 7/44* | (2006.01) |
| *H02M 1/00* | (2006.01) |

(52) U.S. Cl.
CPC .......... *H02P 23/0004* (2013.01); *B60L 11/02* (2013.01); *G05B 6/02* (2013.01); *H02M 7/44* (2013.01); *H02P 23/16* (2016.02); *B60L 2210/10* (2013.01); *B60L 2210/30* (2013.01); *H02M 2001/0025* (2013.01)

(58) Field of Classification Search
CPC .................................. H02P 6/17; G05B 6/02
See application file for complete search history.

(56) References Cited

U.S. PATENT DOCUMENTS

| | | | |
|---|---|---|---|
| 8,824,174 B2 | 9/2014 | Lai et al. | |
| 2006/0265085 A1* | 11/2006 | Chen | G05B 13/024 700/41 |

(Continued)

FOREIGN PATENT DOCUMENTS

| | | |
|---|---|---|
| CN | 102723885 A | 10/2012 |
| CN | 102931660 A | 2/2013 |

(Continued)

OTHER PUBLICATIONS

Yangquan Chen et al., Fractional Order Control—A Tutorial, 2009 American Control Conference, Hyatt Regency Riverfront, St. Louis, MO, Jun. 10-12, 2009, pp. 1397-1411.

(Continued)

*Primary Examiner* — Karen Masih
(74) *Attorney, Agent, or Firm* — Brooks Kushman P.C.

(57) ABSTRACT

A closed-loop system may include a plant (an elctric machine requiring control) and a fractional-order proportional-resonant controller. The fractional-order proportional-resonant controller may have an order greater than zero and less than or equal to one. The order for the fractional-order proportional-resonant controller may be selected to yield a target amplitude and target slope for frequency response. The frequency response may be such that a steady-state error associated with a speed of the electric machine is inversely proportional to the target amplitude and less than a predetermined threshold. The order of the controller may be 0.9.

17 Claims, 3 Drawing Sheets

(56) References Cited

U.S. PATENT DOCUMENTS

2008/0205096 A1    8/2008   Lai et al.
2013/0010505 A1    1/2013   Bo et al.

FOREIGN PATENT DOCUMENTS

CN     104269869 A    1/2015
CN     104300555 A    1/2015

OTHER PUBLICATIONS

Qingyang Chen et al., Lateral Control for Autonomous Parking System With Fractional Order Controller, Journal of Software, vol. 6, No. 6, Jun. 2011, pp. 1075-1081.

Igor Podlubny, Fractional-Order Systems and Fractional-Order Controllers, Slovak Academy of Sciences Institute of Experimental Physics, Nov. 1994, 21 pgs.

Concepcion A. Monje et al., Tuning and Auto-tuning of Fractional Order Controllers for Industry Applications, ScienceDirect, Control Engineering Practice 16 (2008) pp. 798-812.

Hadi Malek, Control of Grid-Connected Photovoltaic Systems Using Fractional Order Operators, a dissertation submitted in partial fulfillment of the requirements for the degree of Doctor of Philosophy in Electrical Engineering for Utah State University, Logan, Utah, 2014, 159 pgs.

* cited by examiner

FRACTIONAL-ORDER PROPORTIONAL-RESONANT CONTROLLER

TECHNICAL FIELD

This disclosure relates to fractional-order proportional-resonant controllers for sinusoidal references.

BACKGROUND

Various types of electric vehicles or power systems draw power from a battery bank or direct current source (e.g., photovoltaic cells, fuel cells, capacitors). Direct current from the battery is fed into an inverter to generate alternating current, which is received by an electric machine or power grid. An error may develop between the demand (reference) and output, commonly referred to as steady-state error. A controller may be used to ensure the output tracks the reference such that the steady-state error is as close to zero as possible. Numerous strategies have been implemented to reduce steady-state error, but generally have drawbacks. The drawbacks may be related to the amount of processing required to control the signal or limited degrees of freedom to properly tune the control system transfer functions.

SUMMARY

A closed-loop system may include a plant (e.g., an electric machine requiring control) and a fractional-order proportional-resonant controller. The fractional-order proportional-resonant controller may have an order greater than zero and less than or equal to one. The order for the fractional-order proportional-resonant controller may be selected to yield a target amplitude and target slope for frequency response. The frequency response may be such that a steady-state error associated with a speed of the electric machine is inversely proportional to the target amplitude and less than a predetermined threshold. The order of the controller may be 0.9. The bandwidth about the natural frequency or resonant frequency of the controller may be one radian per second. The natural frequency of the controller may be $120\pi$ Hz. The proportional gain of the controller may be four. The integral gain of the controller may be 300. The controller may have a gain of at least 50 dB at 60 Hz.

A vehicle may include an inverter for an electric machine and a fractional-order proportional-resonant controller. The fractional-order proportional-resonant controller may have at least three degrees of freedom and an order, greater than zero and less than or equal to one, selected to yield a target amplitude and target slope for frequency response such that a steady-state error associated with an output signal of the electric machine is inversely proportional to the target amplitude and less than a predetermined threshold. The order of the controller may be 0.9. The bandwidth about the natural frequency may be one. The natural frequency of the system may be $120\pi$ Hz. The proportional gain may be four. The integral gain may be 300. The controller may have a gain of at least 50 dB at 60 Hz.

DETAILED DESCRIPTION

Figure 1:
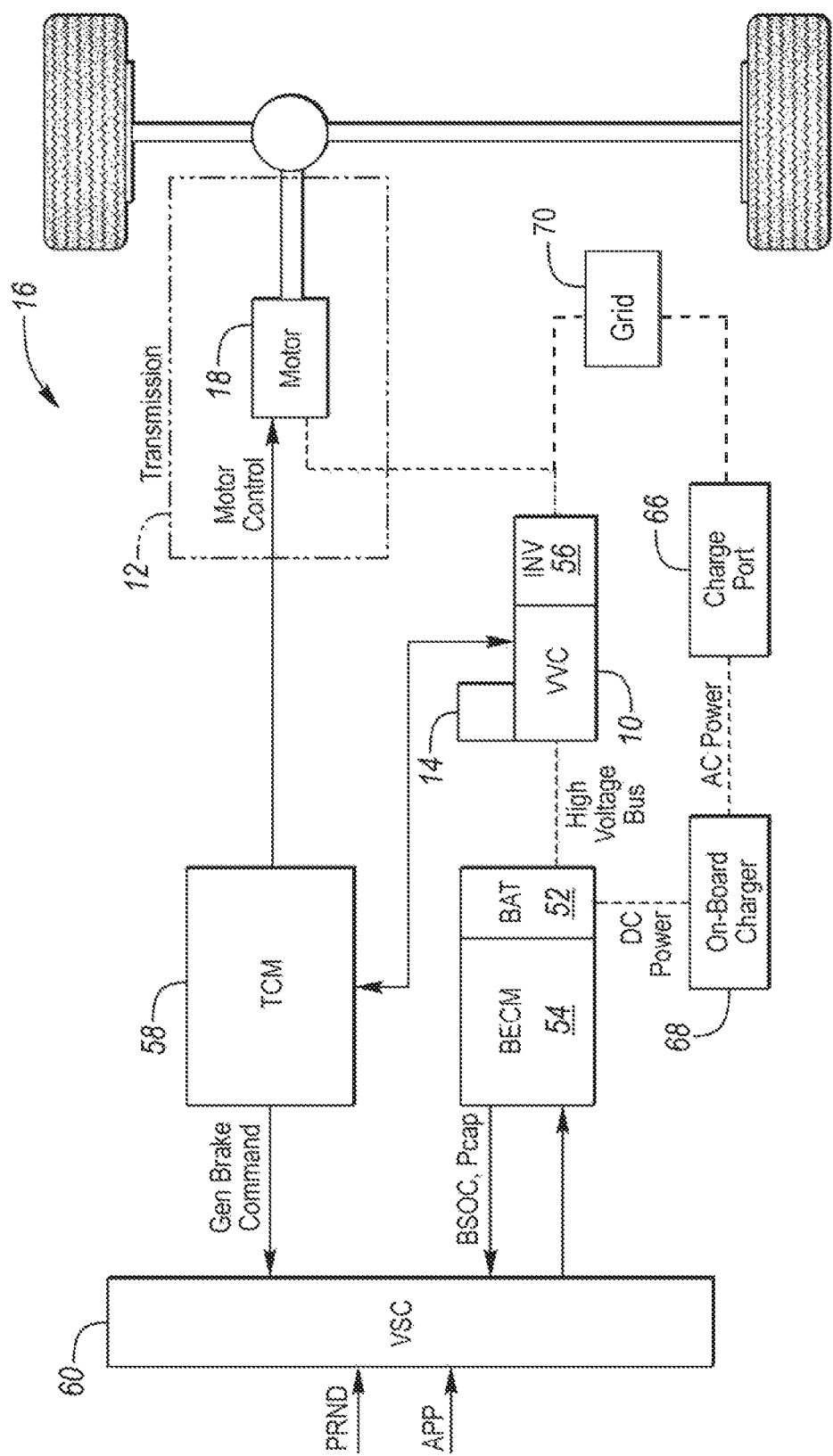
FIG. 1 depicts an electric vehicle or plant.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Controllers are used to achieve an objective output from a particular plant or system. The controller may be implemented as an interconnected system of parts having assigned functions. Some control systems are used to minimize steady state error and ensure proper system response. Typically, these systems employ feedback loops to create a closed-loop system, which reduces steady state error. Resonant systems provide particular challenges to controllers because of their continuously oscillating output.

Closed-loop proportional integral (PI) controllers may be implemented to reduce steady state error of resonant systems. A closed-loop PI controller includes a proportional gain and integral gain. Typically, proportional integral controllers have a transfer function similar to Equation 1 below.

$$G_{PI}(s) = K_P + \frac{K_I}{s} \quad (1)$$

where $K_P$ is the proportional gain and $K_I$ is the integral gain. The PI controller can be used to controller resonant systems by transforming the resonant components of the input signal using Park's transformation or direct-quadrature-zero transformation. PI controllers also require additional feedfoward loops to control resonant systems.

Closed-loop proportional-resonant (PR) controllers may be implemented to reduce steady state error of resonant systems. PR controllers also include proportional gain and integral gain. Typically, second-order PR controllers have a transfer function similar to Equation 2 below.

$$G_{PR}(s) = K_P + \frac{K_I s}{s^2 + \omega_n^2} \quad (2)$$

where $K_P$ is the proportional gain, $K_I$ is the integral gain, and $\omega_n$ is the natural frequency. The PR controller above is an ideal PR controller. The controller is said to have "second-order" because the Laplace operator, s, is raised to the second power. The ideal PR controller has infinite gain but may cause stability problems due to practical limitations for implementing the signal processing systems.

For these reasons, a non-ideal PR transfer function is used instead. The transfer function for a practical, non-ideal, second-order PR controller is shown in Equation 3 below.

$$G_{PR}(s) = K_P + \frac{K_I \omega_c s}{s^2 + 2\omega_c s + \omega_n^2} \quad (3)$$

where $K_P$ is the proportional gain, $K_I$ is the integral gain, and $\omega_n$ is the natural frequency. The resonant frequency may be adjusted to appropriately widen the bandwidth of the controller. Widening of the controller bandwidth may decrease the maximum gain of the controller. The second-order PR controller is said to have three degrees of freedom because the controller may be tuned using $K_P$, $K_I$, and $\omega_C$. Proportional-resonant controllers can operate on a stationary frame signal derived from a Clarke transformation. Proportional-resonant controllers do not require feedforward A fractional-order or arbitrary order controllers may be implemented using fractional-orders integrators and differentiators to enhance an engineer's ability to tune the controller. A fractional-order PID controller is said to increase the degrees of freedom of a PID controller, which has three degrees of freedom, to five degrees of freedom. The fractional-order PID controller, as depicted in Equation 4, includes five degrees of freedom (i.e., $K_P$, $K_I$, $\alpha$, $K_D$, $\beta$).

$$G(s) = K_P + \frac{K_I}{s^\alpha} + K_D s^\beta \quad (4)$$

where $K_P$ is the proportional gain, $K_I$ is the integral gain, $\alpha$ is the fractional-order of the integral component, $K_D$ is the derivative gain, and $\beta$ is the fractional-order of the derivative component.

As discussed above, PI controllers are poorly situated to control resonant systems and PR controllers lack sufficient degrees of freedom to provide fine tuning of the controller. A fractional-order, proportional-resonant (FO-PR) controller can provide additional degrees of freedom and avoid drawbacks related to the implementation of a PI controller on a resonant system. One such FO-PR controller is described in Equation 5.

$$G_{FO-PR}(s) = K_P + \frac{K_I s^\alpha}{s^{2\alpha} - 2\cos(\frac{\alpha\pi}{2})\omega_n^\alpha s^\alpha + \omega_n^{2\alpha}} \quad (5)$$

where $K_P$ is the proportional gain, $K_I$ is the integral gain, $\alpha$ is the fractional-order of the integral component, and $\omega_n$ is the natural frequency at frequency ($2\pi f$). The controller may be adjusted for different frequencies and added in parallel using a similar reference and feedback system as disclosed in FIG. 2, as shown in Equation 6.

$$G_{FO-PR}(s) = \sum_{j=1}^{\infty} K_{Pj} + \frac{K_{Ij} s^\alpha}{s^{2\alpha} - 2\cos(\frac{\alpha\pi}{2})\omega_{nj}^\alpha s^\alpha + \omega_{nj}^{2\alpha}} \quad (6)$$

Adding all of the frequencies in parallel allows for an FO-PR controller to control all of the frequencies anticipated when designing the controller for a particular plant. For example, a vehicle may demand various frequencies for given conditions. The FO-PR controller can provide accurate control of the resonant signal at each of those frequency demands with a smaller steady-state error and higher gain than other controllers. The coefficients, $K_{Pj}$ is the proportional gain, $K_{Ij}$ is the integral gain, $\alpha_j$ is the fractional-order of the integral component, and $\omega_{nj}$, of the FO-PR controller of Equation 6 may be adjusted independently for each frequency. This tuning provides separate controllers with new sets of parameters, which are then paralleled, to address each frequency required.

PI controllers are generally limited to operate on a rotating dq reference frame. The three-phase reference signal, as required by most electric machines and utility grids, is converted into the rotating dq reference frame by a Park transformation. PR controllers are capable of controlling a stationary reference frame on an α-β or x-y plane. A stationary reference frame is generally derived using a Clarke transformation of a three-phase reference signal.

An example vehicle having an electric machine is depicted in FIG. 1 and referred to generally as a vehicle 16. It is noted that a vehicle's electric machine and inverter is only one example of a plant that may be controlled by a fractional-order proportional-resonant controller. For example, a universal power supply could also be a plant controlled using a similar method. Continuing, the vehicle 16 includes a transmission 12 and is propelled by at least one electric machine 18 and may have selective assistance from an internal combustion engine (not shown). The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The vehicle 16 includes an energy storage device, such as a traction battery 52 for storing electrical energy. The battery 52 is a high-voltage battery that is capable of outputting electrical power to operate the electric machine 18. The battery 52 also receives electrical power from the electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the electric machine 18. The VVC 10 "boosts" or increases the voltage potential of the electrical power provided by the battery 52. The VVC 10 also "bucks"

or decreases the voltage potential of the electrical power provided to the battery 52, according to one or more embodiments. The inverter 56 inverts the DC power supplied by the main battery 52 (through the VVC 10) to AC power for operating the electric machine 18. The inverter 56 also rectifies AC power provided by the electric machine 18 to DC for charging the traction battery 52. Other embodiments of the transmission 12 include multiple inverters (not shown), such as one invertor associated with each electric machine 18. The VVC 10 includes an inductor assembly 14.

The transmission 12 includes a transmission control module (TCM) 58 for controlling the electric machine 18, the VVC 10, and the inverter 56. The TCM 58 is configured to monitor, among other things, the position, speed, and power consumption of the electric machine 18. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

If the vehicle 16 is a plug-in electric vehicle, the battery 52 may periodically receive AC energy from an external power supply or grid 70, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. It is understood that the electric machine 18 may be implemented on other types of electric vehicles, such as a hybrid-electric vehicle or a fully electric vehicle.

Figure 2:
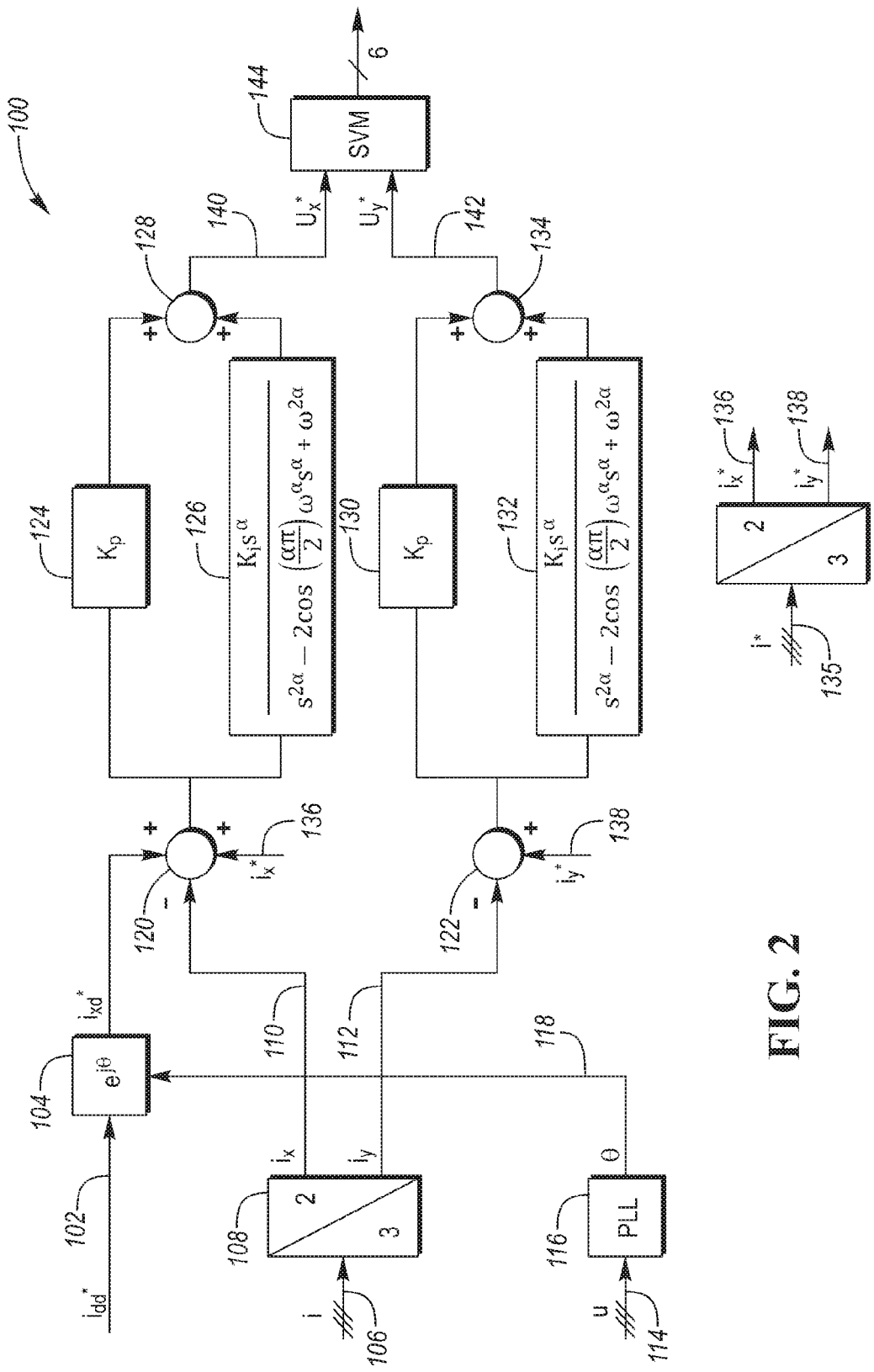
FIG. 2 depicts a FO-PR controller for an electric vehicle or three-phase inverter.

Now referring to FIG. 2, a fractional-order, proportional-resonant controller 100 is shown. The controller 100 includes a stationary frame x-component current input derived from the summation 120 of $i_{xd}$*, $i_x$ 110, and $i_x$* 136. Input $i_{xd}$* is derived from $i_{dd}$* 102 having a rotating reference frame d and space vector block 104, which incorporates the feedback phase shift angle 118. The feedback phase shift angle 118 is derived from the phase-locked loop (PLL) 116 controller and voltage signal 114. Input $i_x$ 110 is the stationary frame x-component of the three-phase feedback current signal i 106 from the output of the inverter (not shown). The $i_x$* 136 is a stationary frame reference signal from a grid current or other reference current, i* 135. Similarly, the controller 100 includes an y-component current input derived from the summation 122 of $i_y$ 112 and $i_y$* 138. $i_y$ 112 is the y-component of the feedback current signal from the output of the inverter (not shown). The $i_y$* 138 is a reference signal from a grid current or other reference current, i* 135.

The summation blocks 120, 122 are individually fed into respective FO-PR transfer functions. For example, signal $i_x$ is adjusted by a proportional gain $K_P$ 124 and a fractional-order, resonant transfer function 126 having adjustable constants $K_I$, α, and ω. The proportional and integral components are joined at summation block 128 having an out of voltage $U_x$* 140. Similarly, signal $i_x$ is adjusted by a proportional gain $K_P$ 130 and a fractional-order, resonant transfer function 132 having adjustable constants $K_I$, α, and ω. The proportional and integral components are joined at summation block 134 having an output of voltage, $U_y$* 142. The outputs $U_x$* 140 and $U_y$* 142 are fed to the space vector modulation block (SVM) 144. The SVM 144 allows the generation of pulse width modulation signals without converting the space vector outputs from the controller, $U_x$* 140 and $U_y$* 142, into three-phase values first.

Figure 3A:
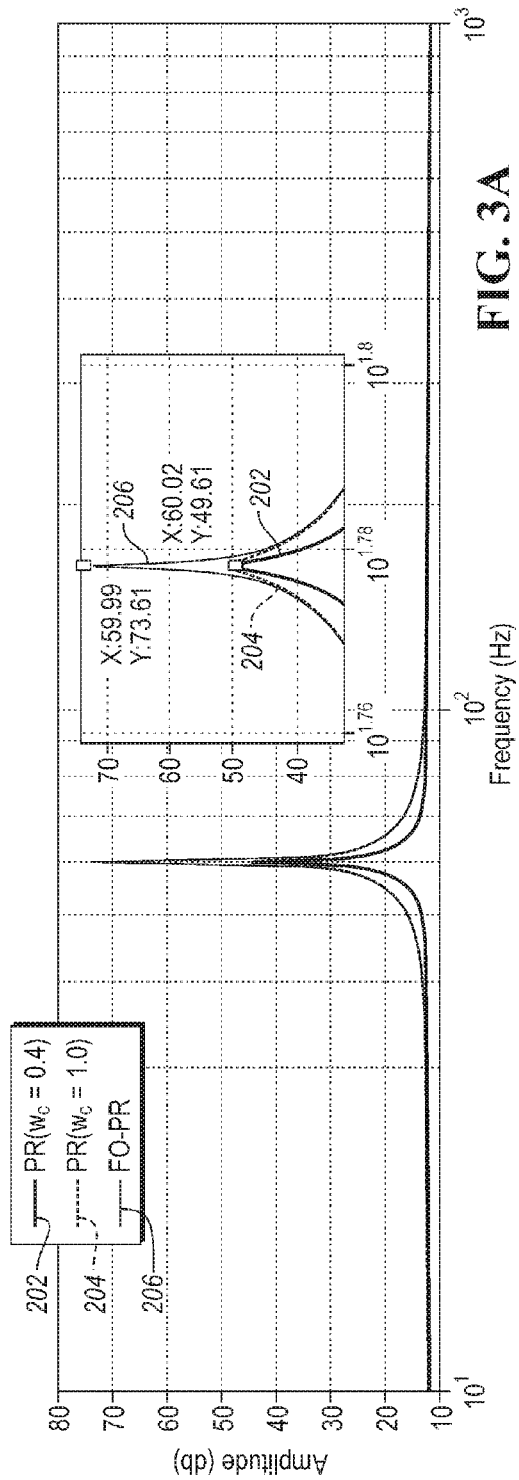
FIGS. 3A and 3B depict the system response at a $120\pi$ natural frequency.
Figure 3B:
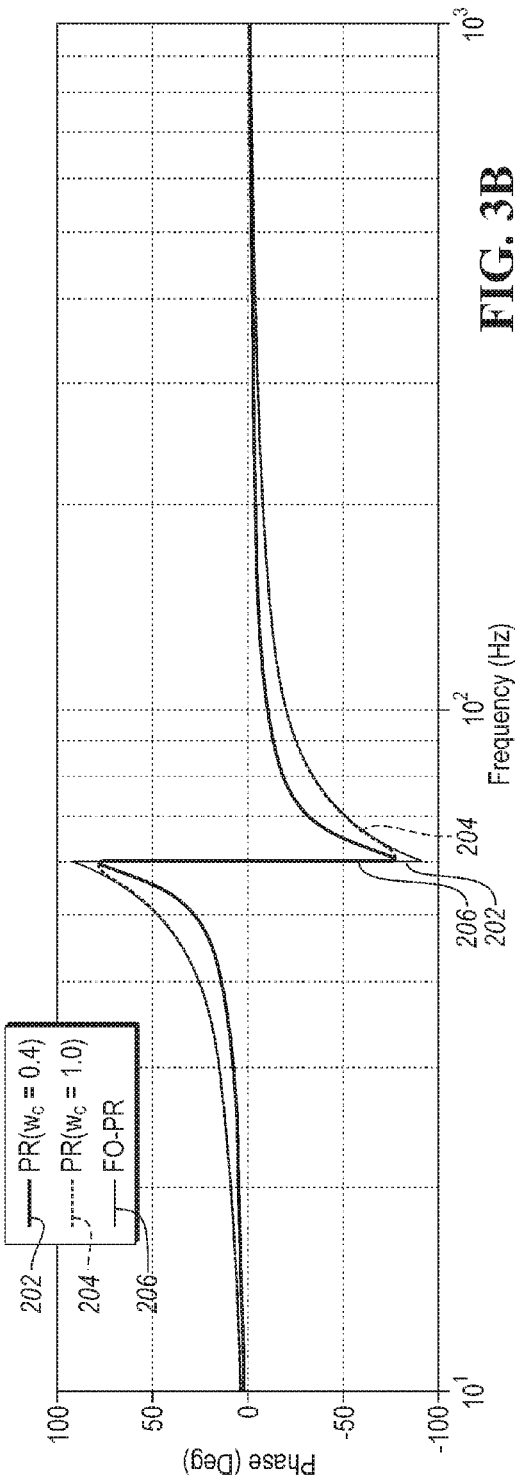

Referring to FIGS. 3A-B, the numerical results of the FO-PR controller are depicted. FIG. 3A discloses the gain of the FO-PR controller having wherein the natural frequency is 120π Hz, the proportional gain is four, the integral gain is 300, and alpha (fractional order) is 0.9. As shown, the reduced bandwidth PR controller 202 having a reduced bandwidth of 0.4, $ω_B$, where $ω_B$=(−1.196ζ+1.85)$ω_n$. Where ζ is the damping ratio and $ω_n$ is the natural frequency. As shown, the 1.0 bandwidth PR controller 204 has a wider bandwidth than the reduced bandwidth controller, but a smaller gain. The FO-PR controller 206 has substantially higher gain than either PR controller 202, 204 at over 70 dB and provides a wider bandwidth. FIG. 3B depicts the phase-shift response of each controller. The reduced bandwidth PR controller 202 has a larger phase-shift near the resonant frequency of 60 Hz than the 1.0 bandwidth PR controller 204. The FO-PR controller 206 has the best phase-shift response, as shown.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. A vehicle comprising:
an electric machine; and
a fractional-order proportional-resonant controller programmed with an order greater than zero and less than or equal to one and to generate, responsive to a signal indicative of a speed of the electric machine, a target amplitude and target slope for frequency response such that a steady-state error associated with the speed is inversely proportional to the target amplitude and less than a predetermined threshold.

2. The vehicle of claim 1, wherein a gain of the controller is 22 dB greater than a proportional-resonant controller having same coefficients.

3. The vehicle of claim 2, wherein the order is 0.9.

4. The vehicle of claim 3, wherein a natural frequency of the controller is $120\pi$ Hz.

5. The vehicle of claim 4, wherein a proportional gain is four.

6. The vehicle of claim 5, wherein an integral gain is 300.

7. The vehicle of claim 1, wherein the controller has a gain of at least 50 dB at 60 Hz.

8. A vehicle comprising:

an inverter for an electric machine; and a fractional-order proportional-resonant controller programmed with at least three degrees of freedom and an order greater than zero and less than or equal to one and to generate, responsive to a signal indicative of a speed of the electric machine, a target amplitude and target slope for frequency response such that a steady-state error associated with the speed of is inversely proportional to the target amplitude and less than a predetermined threshold.

9. The vehicle of claim 8, wherein a gain of the controller is 22 dB greater than a proportional-resonant controller having same coefficients.

10. The vehicle of claim 9, wherein the order is 0.9.

11. The vehicle of claim 10, wherein a natural frequency of the controller is $120\pi$ Hz.

12. The vehicle of claim 11, wherein a proportional gain is four.

13. The vehicle of claim 12, wherein an integral gain is 300.

14. The vehicle of claim 8, wherein the controller has a gain of at least 50 dB at 60 Hz.

15. The vehicle of claim 14, wherein a natural frequency of the controller is adjusted to coincide with a frequency demand.

16. A control system comprising:

an inverter connected to a power grid; and a fractional-order controller having an order greater than zero and less than or equal to one, inputs having a stationary reference frame, and controller constants selected to yield a target amplitude and target slope for frequency response such that a steady-state error associated with a frequency of the power grid is inversely proportional to the target amplitude and less than a predetermined threshold, wherein a gain of the controller is 22 dB greater than a proportional-resonant controller having same coefficients.

17. The control system of claim 16, wherein a natural frequency of the controller is $120\pi$ Hz.

* * * * *